US012770887B2

(12) United States Patent
Liao et al.

(10) Patent No.: US 12,770,887 B2
(45) Date of Patent: Oct. 20, 2026

(54) NEGATIVE ELECTRODE SHEET AND USE THEREOF

(71) Applicant: Zhuhai CosMX Battery Co., Ltd., Guangdong (CN)

(72) Inventors: Kejun Liao, Guangdong (CN); Shiguang Li, Guangdong (CN)

(73) Assignee: ZHUHAI COSMX BATTERY CO., LTD., Guangdong (CN)

( * ) Notice: Subject to any disclaimer, the term of this patent is extended or adjusted under 35 U.S.C. 154(b) by 650 days.

(21) Appl. No.: 18/225,647

(22) Filed: Jul. 24, 2023

(65) Prior Publication Data

US 2023/0369605 A1 Nov. 16, 2023

Related U.S. Application Data

(63) Continuation of application No. PCT/CN2022/088956, filed on Apr. 25, 2022.

(30) Foreign Application Priority Data

May 21, 2021 (CN) ......................... 202110559916.0

(51) Int. Cl.
*H01M 4/70* (2006.01)
*H01M 4/02* (2006.01)
(Continued)

(52) U.S. Cl.
CPC ............. *H01M 4/70* (2013.01); *H01M 4/133* (2013.01); *H01M 10/0525* (2013.01); *H01M 2004/027* (2013.01)

(58) Field of Classification Search
None
See application file for complete search history.

(56) References Cited

U.S. PATENT DOCUMENTS

2013/0048340 A1 2/2013 Bando et al.
2014/0011067 A1 1/2014 Baba
2016/0013469 A1 1/2016 Tajima et al.

FOREIGN PATENT DOCUMENTS

CN 101569051 A 10/2009
CN 101604740 A 12/2009
(Continued)

OTHER PUBLICATIONS

National Intellectual Property Office of China, "Notification of Grant of Patent Rights for Invention Application" in Application No. 202110559916.0, Nov. 22, 2023, 7 pages.
(Continued)

*Primary Examiner* — Sean P Cullen
*Assistant Examiner* — Heng M. Chan
(74) *Attorney, Agent, or Firm* — Davis Wright Tremaine LLP

(57) ABSTRACT

Provided in the present application are a negative electrode sheet and use thereof. The negative electrode sheet in the present application includes a negative electrode current collector and a negative electrode active layer that is disposed on at least one functional surface of the negative electrode current collector, where the negative electrode active layer includes a first negative electrode active layer and a second negative electrode active layer in a first direction of the negative electrode current collector, and the second negative electrode active layer is close to a side edge of the negative electrode current collector, and a ratio of a thickness of the second negative electrode active layer to a thickness of the first negative electrode active layer is (0.8-1.1):1.

14 Claims, 4 Drawing Sheets

(51) Int. Cl.
*H01M 4/133* (2010.01)
*H01M 10/0525* (2010.01)

(56) References Cited

FOREIGN PATENT DOCUMENTS

| | | | | | |
|---|---|---|---|---|---|
| CN | 101640280 | A | | 2/2010 | |
| CN | 207009552 | U | | 2/2018 | |
| CN | 108258185 | A | | 7/2018 | |
| CN | 108400386 | A | * | 8/2018 | ........ H01M 10/0525 |
| CN | 108432027 | A | | 8/2018 | |
| CN | 210607438 | U | | 5/2020 | |
| CN | 111816838 | A | | 10/2020 | |
| CN | 112103463 | A | | 12/2020 | |
| CN | 112133885 | A | | 12/2020 | |
| CN | 112701250 | A | | 4/2021 | |
| CN | 112750973 | A | | 5/2021 | |
| CN | 113299878 | A | | 8/2021 | |
| CN | 114597335 | A | | 6/2022 | |
| JP | 2016012541 | A | * | 1/2016 | |
| WO | 2021080186 | A1 | | 4/2021 | |

OTHER PUBLICATIONS

First Office Action issued in related Chinese Application No. 202110559916.0, in 23 pages.
Second Office Action issued in related Chinese Application No. 202110559916.0, in 10 pages.
International Search Report issued in related International Application No. PCT/CN2022/088956, mailed on Jul. 6, 2022, in 16 pages.

* cited by examiner

NEGATIVE ELECTRODE SHEET AND USE THEREOF

CROSS-REFERENCE TO RELATED APPLICATIONS

This application is a continuation of International Application No. PCT/CN2022/088956, filed on Apr. 25, 2022, which claims priority to Chinese Patent Application No. 202110559916.0, filed on May 21, 2021. The disclosures of the aforementioned applications are hereby incorporated by reference in their entireties.

TECHNICAL FIELD

The present application relates to the field of battery technology and, in particular, to a negative electrode sheet and use thereof.

BACKGROUND

In order to realize the performance of lithium-ion battery such as high rate and fast charging, a lithium-ion battery having a zebra-like coated electrode sheet and a multi-tab winding structure has been created. The structure of the zebra-like coated electrode sheet is composed of multiple empty foil zones and active layer zones, which fits with the multi-tab winding process, therefore, the full utilization of materials can be achieved. Currently, when preparing a lithium-ion battery having the multi-tab winding structure by the zebra-like coated electrode sheet, there will be a problem of edge bulging when the coated electrode sheet is wound. In order to improve the problem of edge bulging when the coated electrode sheet is wound, the edge of the electrode sheet is thinned so that the edge zone of the electrode sheet is thinner than the middle active layer zone of the electrode sheet, and the phenomenon that the edge zone of the electrode sheet is thinner than the middle active layer zone of the electrode sheet is called electrode sheet "edge thinning" phenomenon.

Usually, the thickness of the edge of the electrode sheet is about a few microns thinner than that of the middle active layer zone of the electrode sheet, and after the electrode sheet is repeatedly wound, the accumulated thickness of the edge of the electrode sheet is about a few millimeters thinner than that of the middle active layer zone of the electric core, resulting in the depression at the side of the prepared electric core connected to a tab, which affects the appearance of the electric core. In the hot pressing formation process, the side of the electric core connected to the tab is depressed, and due to the interfacial tension, the edge of the positive electrode sheet is less pressed, and the adhesion of the edge is worse than that of the main body of the electric core after the formation, and the interfacial distance between the negative electrode sheet and a separating membrane is increased, the ion diffusion path is elongated, and the local impedance is increased. Usually, during the charging process, lithium ions are quickly diffused to the surfaces of the separating membrane and the negative electrode sheet, and when the side of the electric core connected to the tab is depressed, lithium ions cannot be timely diffused to an inner layer of the negative electrode sheet, and will form polarization, deposit on the edge of the negative electrode sheet, thereby causing lithium precipitation at the edge of the negative electrode sheet.

Then, the electrode sheet "edge thinning" phenomenon also causes an adverse effect on the rolling process. When the electrode sheet is subjected to rolling, the inconsistency of the horizontal thickness of the electrode sheet lead to different rolling forces in the middle and edge zones of the electrode sheet, which not only causes the inconsistency of horizontal compaction density of the electrode sheet, affecting the performance of lithium-ion battery, but also makes the electrode sheet more likely to have snake-shaped electrode sheet. The snake-shaped electrode sheet make the positive and negative electrode sheets in the obtained electric core cannot be completely covered, which ultimately generate a great impact on the safety performance of the lithium-ion battery.

SUMMARY

The present application provides a negative electrode sheet. A negative electrode active layer of the negative electrode sheet has a good thickness consistency, which can improve the depression phenomenon that occurs at an edge of a lithium-ion battery prepared from an existing edge-thinned negative electrode sheet, or improve the bulging phenomenon that occurs at an edge of a lithium-ion battery prepared from an existing edge-unthinned negative electrode sheet.

The present application provides a lithium-ion battery which has a good thickness consistency.

The present application provides a negative electrode sheet including a negative electrode current collector, and a negative electrode active layer that is disposed on at least one functional surface of the negative electrode current collector;

- the negative electrode active layer includes a first negative electrode active layer and a second negative electrode active layer in a first direction of the negative electrode current collector;
- the second negative electrode active layer is close to a first side edge of the negative electrode current collector;
- a ratio of a thickness of the second negative electrode active layer to a thickness of the first negative electrode active layer is (0.8-1.1):1.

For the negative electrode sheet as described above, the thickness of the second negative electrode active layer is equal to the thickness of the first negative electrode active layer.

For the negative electrode sheet as described above, the second negative electrode active layer is a thermal effect layer.

For the negative electrode sheet as described above, in the first direction, the second negative electrode active layer has a size of W2 and the first negative electrode active layer has a size of W1, W1>W2.

For the negative electrode sheet as described above, W2=2 μm-30 μm.

For the negative electrode sheet as described above, the negative electrode sheet further includes a tab;

- the tab is formed by the negative electrode current collector protruding from the first side edge.

For the negative electrode sheet as described above, the negative electrode sheet further comprises a serrated extension part, and the serrated extension part is located at and/or protrudes from the first side edge;

- one end of the serrated extension part is connected to the second negative electrode active layer and the other end of the serrated extension part extends in a direction away from the second negative electrode active layer.

For the negative electrode sheet as described above, the serrated extension part includes N serrated sub-extension parts arranged sequentially in a second direction of the negative electrode current collector, and the second direction is perpendicular to the first direction, N>1;

in the first direction, the serrated sub-extension parts have a size of W3, 0 μm<W3≤100 μm.

For the negative electrode sheet as described above, the serrated sub-extension parts have a size of 50 μm-100 μm.

For the negative electrode sheet as described above, the maximum distance between adjacent serrated sub-extension parts is 50 μm-60 μm.

The present application further provides a lithium-ion battery including the negative electrode sheet as described above.

A negative electrode sheet in the present application includes a negative electrode current collector, and a negative electrode active layer that is disposed on at least one functional surface of the negative electrode current collector, where the negative electrode active layer includes a first negative electrode active layer and a second negative electrode active layer in a first direction of the negative electrode current collector, and the second negative electrode active layer is close to a first side edge of the negative electrode current collector, and a ratio of a thickness of the second negative electrode active layer to a thickness of the first negative electrode active layer is (0.8-1.1):1. In the negative electrode sheet of the present application, the thickness of the second negative electrode active layer near the first side edge is close to the thickness of the first negative electrode active layer, and therefore, the negative electrode sheet has a high thickness consistency, therefore, a lithium-ion battery with a consistent thickness can be prepared, and during long-term charging and discharging processes, this lithium-ion battery has less lithium precipitation at the position near the first side edge, and has a good recycling performance.

BRIEF DESCRIPTION OF DRAWINGS

To illustrate the technical solutions in embodiments of the present application or in the related art more clearly, the following briefly introduces the accompanying drawings needed for describing the embodiments or the related art. Apparently, the accompanying drawings in the following description illustrate merely some embodiments of the present application, and persons of ordinary skill in the art may still derive other drawings from these accompanying drawings without creative effort.

DESCRIPTION OF REFERENCE NUMBERS

1: first negative electrode active layer;
2: second negative electrode active layer;
3: first side edge;
4: tab;
5: serrated extension part;
6: deviation correcting control unit;
7: first photoelectric sensor;
8: laser treatment unit;
9: wind nozzle decontamination unit;
10: second photoelectric sensor;
11: winding unit;
12: transmission unit.

DESCRIPTION OF EMBODIMENTS

The following clearly and comprehensively describes the technical solutions in embodiments of the present application with reference to the accompanying drawings in embodiments of the present application. Apparently, the described embodiments are merely a part rather than all embodiments of the present application. All other embodiments obtained by persons of ordinary skill in the art based on embodiments of the present application without creative effort shall fall within the protection scope of the present application.

Figure 1:
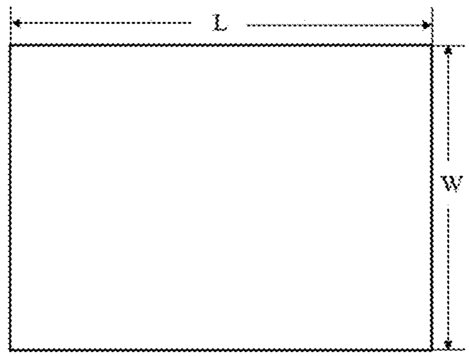
FIG. 1 is a top view of a current collector in the present application.

FIG. 1 is a top view of a current collector in the present application. As shown in FIG. 1, the "length L direction" and "width W direction" of the current collector are referred to for all the definitions with respect to "length" and "width" below. Functional surfaces of the current collector (the functional surfaces are the two largest and opposite surfaces of the current collector, which are used to set active layers) are taken as being rectangular for example, the length L direction of the current collector is the direction of the largest side of the functional surface of the current collector, and the width W direction of the current collector is the direction of the smallest side of the functional surface of the current collector. For example, it is defined in the present application that a first negative electrode active layer has a width of W1, which means that, in the width direction of the current collector, the first negative electrode active layer has a size of W1.

Figure 2:
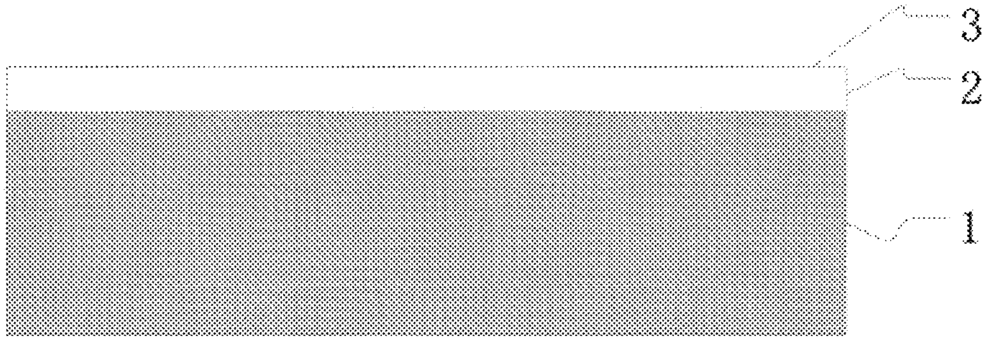
FIG. 2 is a top view of a negative electrode sheet in the first embodiment of the present application.
Figure 3:
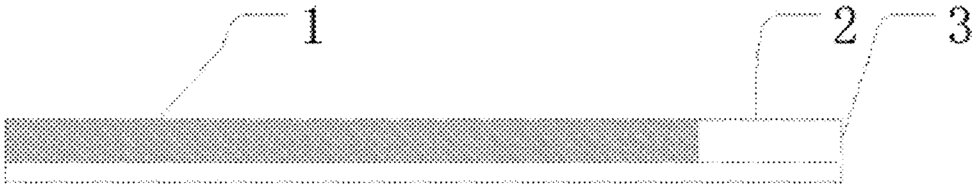
FIG. 3 is a side view of the negative electrode sheet in FIG. 2 of the present application.

FIG. 2 is a top view of a negative electrode sheet in the first embodiment of the present application; and FIG. 3 is a side view of the negative electrode sheet in FIG. 2 of the present application. As shown in FIGS. 2 and 3, a first aspect of the present application provides a negative electrode sheet including a negative electrode current collector and a negative electrode active layer that is disposed on at least one functional surface of the negative electrode current collector;

the negative electrode active layer includes a first negative electrode active layer 1 and a second negative electrode active layer 2 in a first direction of the negative electrode current collector;

the second negative electrode active layer 2 is close to a first side edge 3 of the negative electrode current collector;

the ratio of the thickness of the second negative electrode active layer to the thickness of the first negative electrode active layer is (0.8-1.1):1.

The first direction is not particularly limited in the present application, and the first direction can be the length direction of the current collector, and also can be the width direction of the current collector. When a lithium-ion battery with a winding structure is prepared using the negative electrode sheet of the present application, the first direction is the width direction of the current collector. When a lithium-ion battery with a stacked structure is prepared using the negative electrode sheet of the present application, the first direction is the length direction or the width direction of the current collector.

In the present application, a second direction is perpendicular to the first direction, and when the first direction is the width direction of the current collector, the second direction is the length direction of the current collector, and when the first direction is the length direction of the current collector, the second direction is the width direction of the current collector.

In the present application, the first side edge 3 extends along the second direction of the current collector, and a tab protrudes from the first side edge 3.

Because in the negative electrode sheet of the present application, the thickness of the second negative electrode active layer 2 near the first side edge 3 is close to the thickness of the first negative electrode active layer 1, the negative electrode sheet has high thickness consistency, therefore, a lithium-ion battery with consistent thickness can be prepared, and during long-term charging and discharging processes, this lithium-ion battery has less lithium precipitation at the position near the first side edge 3, and has a good cycling performance.

In some embodiments of the present application, the thickness of the second negative electrode active layer 2 is equal to the thickness of the first negative electrode active layer 1.

In the present application, when the thickness of the second negative electrode active layer 2 is equal to the thickness of the first negative electrode active layer 1, the obtained negative electrode sheet has better thickness consistency. Therefore, when preparing a lithium-ion battery, the phenomenon that the depression occurs near the first side edge 3 of the lithium-ion battery prepared from an existing edge-thinned negative electrode sheet can be better improved, or the phenomenon that edge bulging occurs near the first side edge 3 of the lithium-ion battery prepared from an existing edge-unthinned negative electrode sheet can be improved. Therefore, not only the phenomenon of lithium precipitation near the first side edge 3 of the negative electrode sheet of the lithium-ion battery can be improved during long-term charging and discharging processes, thereby further improving the cycle performance of the lithium-ion battery, but also the problem that the transverse compaction density of the negative electrode sheet is inconsistent due to inconsistent thickness of the negative electrode sheet can be improved, thereby more likely avoiding the appearance of snake-shaped electrode sheets, so that the positive and negative electrode sheets in the obtained lithium-ion battery can be covered as completely as possible, thereby improving the safety performance of the lithium-ion battery.

In some embodiments of the present application, the second negative electrode active layer 2 is a thermal effect layer.

In some embodiments, a first side surface of the first negative electrode active layer 1 is subjected to thermal effect treatment along the second direction of the negative electrode current collector to obtain a negative electrode sheet with good thickness consistency, where the first side surface extends along the second direction of the negative electrode current collector, near the first side edge 3 and perpendicular to the negative electrode current collector.

It can be understood that when the first side surface of the first negative electrode active layer 1 is subjected to the thermal effect treatment, the temperature of the first side surface will rise above the phase change point of the first negative electrode active layer 1 at a very fast rate due to the first side surface being heated. Because the negative electrode active substance has excellent thermal conductivity, the first negative electrode active layer 1 will be rapidly cooled and quenched when the heat source leaves, thereby transforming thermal activity unstable carbon atoms to ordered graphite crystal structures to obtain finer hardened tissues, therefore, a thermal effect layer is formed, at this point the thermal effect layer is the second negative active layer 2. In some embodiments, the thermal effect treatment can be laser treatment.

Figure 4:
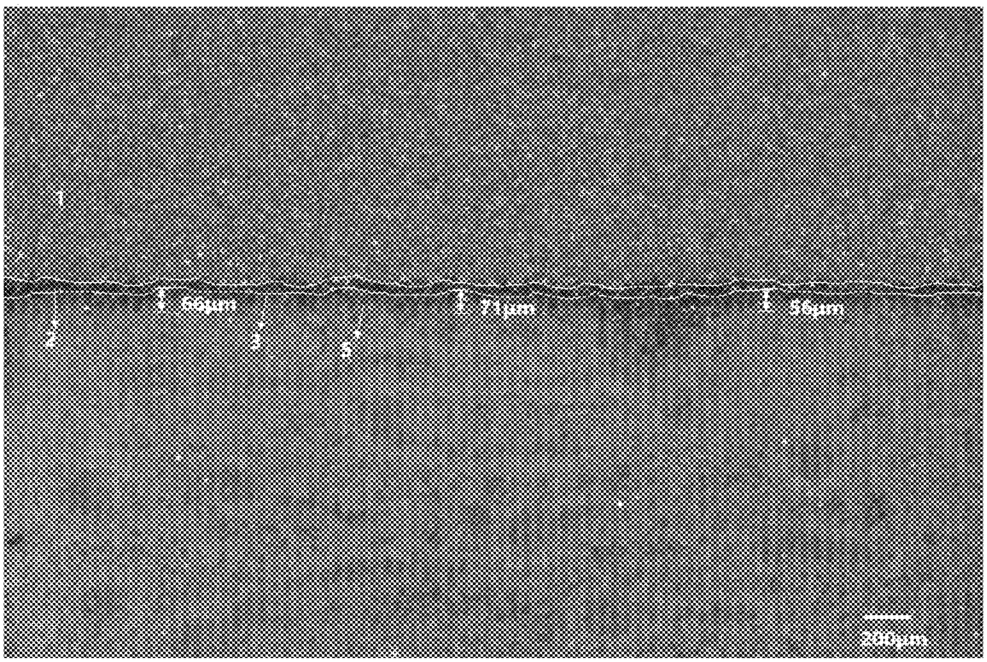
FIG. 4 is a top view 3D microscope image of a negative electrode sheet in some embodiments of the present application.
Figure 5:
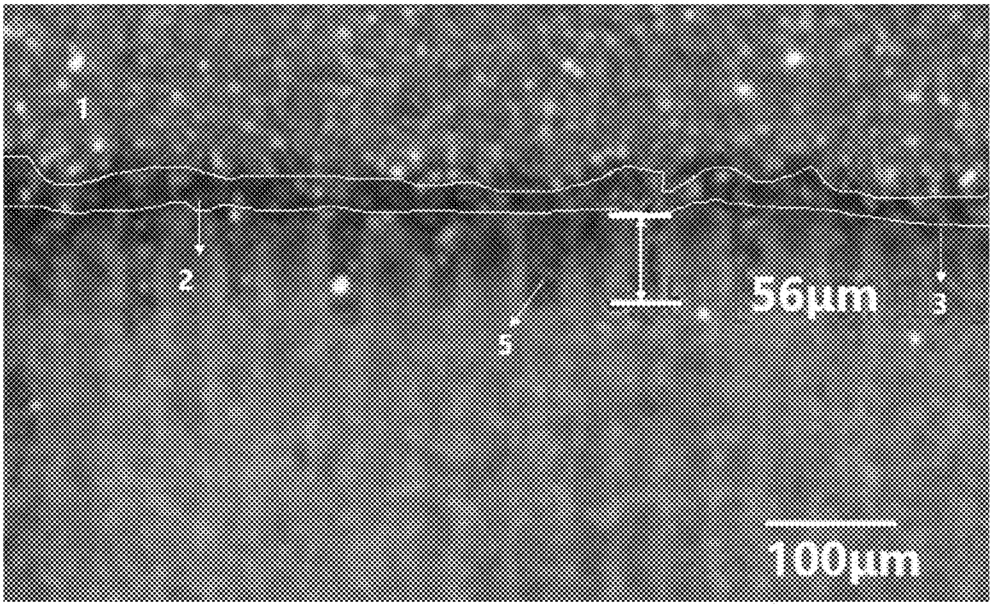
FIG. 5 is a partial enlarged view of FIG. 4 of the present application.
Figure 6:
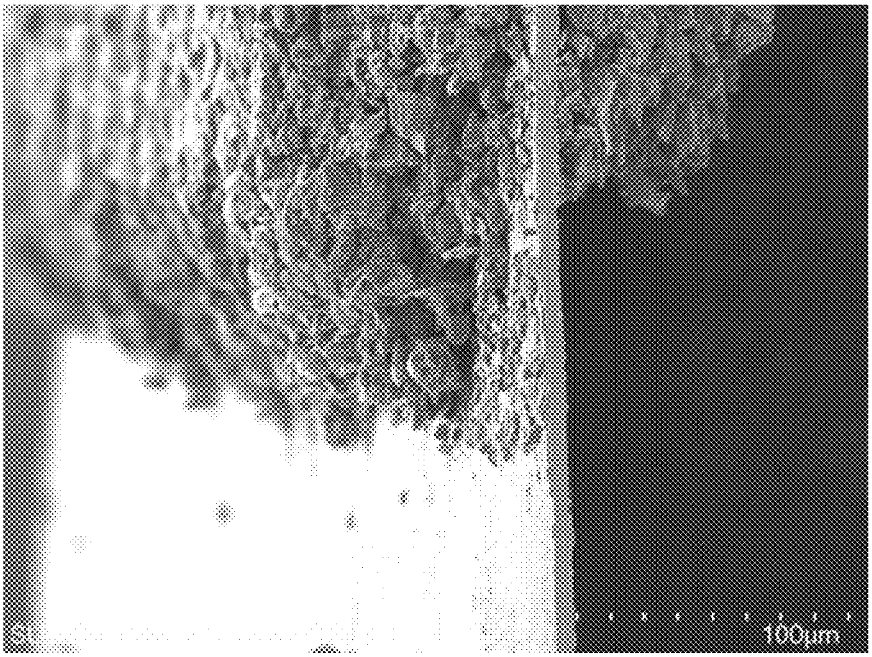
FIG. 6 is a scanning electron microscope (SEM) image of a cross section of a negative electrode sheet in some embodiments of the present application.

FIG. 4 is a top view 3D microscope image of a negative electrode sheet in some embodiments of the present application; FIG. 5 is a partial enlarged view of FIG. 4 of the present application; and FIG. 6 is a scanning electron microscope (SEM) image of a cross section of a negative electrode sheet in some embodiments of the present application. In the present application, the surface of the negative electrode sheet is observed using 3D microscope, and as shown in FIG. 4 and FIG. 5, in the first direction of a current collector, a negative electrode sheet of the present application includes a first negative electrode active layer 1 and a second negative electrode active layer 2 (a thermal effect layer), and the thermal effect layer is near a first side edge 3, and the color of the thermal effect layer is darker than the color of the first negative electrode active layer 1 and the color of the empty current collector. A cross section at the thermal effect layer is observed using SEM, as shown in FIG. 6, the thermal effect layer has a lot of fine hardened tissues, and the fine hardened tissues are closely attached to the negative electrode current collector.

The inventors speculate that since the first side surface of the first negative electrode active layer 1 is rapidly cooled and quenched after the first side surface is heated, the hardening degree of graphite particles in the first negative electrode active layer 1 can be increased and a thermal effect layer containing the graphite particles with high hardening degree can be formed. Thus, the thermal effect layer can be closely attached to the negative electrode current collector, thereby improving the electrical performance of the lithium-ion battery, and extending the service life of the lithium-ion battery.

In the present application, because the second negative electrode active layer 2 near the first side edge 3 is a thermal effect layer, and the thermal effect layer has a stronger binding force with the negative electrode current collector, the attachment of the negative electrode active layer to the negative electrode current collector can be improved. Therefore, the peeling problem of the negative electrode active layer and the negative electrode current collector that occurs at positions of the negative electrode sheet near the tab zone can be effectively improved during long-term charging and discharging cycles of the lithium-ion battery, and the breakage of the PP layer due to the peeled graphite in the first negative electrode active layer 1 can be avoided, and the formation of electron channels that are electrochemically corroded at broken positions of the PP layer can be avoided, further the phenomena such as bulging and corner cracking of the lithium-ion battery can be avoided, thereby improving the electrical performance of the lithium-ion battery, and extending the service life of the lithium-ion battery.

In order to verify the improvement of peeling ability between the negative electrode active layer and the negative electrode current collector of the negative electrode sheet by the present application, the following tests are conducted. One hundred meters of a negative electrode sheet of the present application (an experimental group) and one hundred meters of a negative electrode sheet on which only a first negative electrode active layer is disposed (a control group) are taken and subjected to a frequency sweep vibration test. In particular, both of the negative electrode sheets are installed on a work surface of a vibration table for vibration. The vibration starts in the form of a sine wave, which is increased from 7 Hz to 200 Hz, and then is weakened to 7 Hz as a cycle. One cycle lasts for 15 minutes of logarithmic sweep, with a total duration of 6 hours. The negative electrode active substances that peel off from the two groups of the negative electrode sheets are collected and weighed with a high-precision balance. The results show that the mass of the negative electrode active substance collected in the experimental group is only 10% of that collected in the control group, which proves that due to the inclusion of a thermal effect layer in the negative electrode sheet of the present application, the thermal effect layer has better binding force with the negative electrode current collector, and the negative electrode active layer can be closely attached to the negative electrode current collector, thereby effectively improving the problem that the negative electrode active layer and the negative electrode current collector, which are near the tab zone, are easy to peel off.

In order to further verify the improvement on electrochemical corrosion of the lithium-ion battery prepared by the negative electrode sheet of the present application, the electroplating experiment is used for quantitative analysis, and by observing whether there is precipitation of metallic copper at certain positions of an aluminum plastic film, whether there are breakage points at the corresponding positions of the aluminum plastic film can be concluded. The electroplating experiment is that a lithium-ion battery prepared by a negative electrode sheet of the present application is disassembled to obtain a first aluminum plastic film (an experimental group); a lithium-ion battery prepared by a negative electrode sheet only including a first negative electrode active layer is disassembled to obtain a second aluminum plastic film (a control group); shells of two aluminum plastic films are filled with aqueous copper sulfate solution, respectively; electrodes are contacted with the aqueous copper sulfate solution and aluminum layers of the aluminum plastic films respectively; energizing is performed continuously; after the energizing is performed to react for a certain period of time, there may be precipitation of metallic copper at some positions of the aluminum plastic films if there are breakage points at the corresponding positions of the aluminum plastic films. Positions where metallic copper is precipitated from the aluminum plastic films are the places where the aluminum plastic films are broken.

It is observed from the experiment that the breakage area of the aluminum plastic film in the experimental group is 20% of the breakage area of the aluminum plastic film in the control group. It is shown that due to the presence of a thermal effect layer near the first side edge 3 of the negative electrode sheet of the present application, the thermal effect layer can be closely attached to the negative electrode current collector, thereby avoiding the separation of the thermal effect layer near the first side edge 3 from the negative electrode current collector, further effectively improving the electrochemical corrosion of the lithium-ion battery, improving the electrical performance of the lithium-ion battery, and extending the service life of the lithium-ion battery.

In the present application, if, in the first direction, the size of the second negative electrode active layer 2 is too wide, the production cost is higher, so in order to save the production cost, in some embodiments of the present application, in the first direction, the second negative electrode active layer 2 has a size of W2 and the first negative electrode active layer 1 has a size of W1, W1>W2.

Further, in some embodiments of the present application, W2=2 μm-30 μm.

Figure 7:
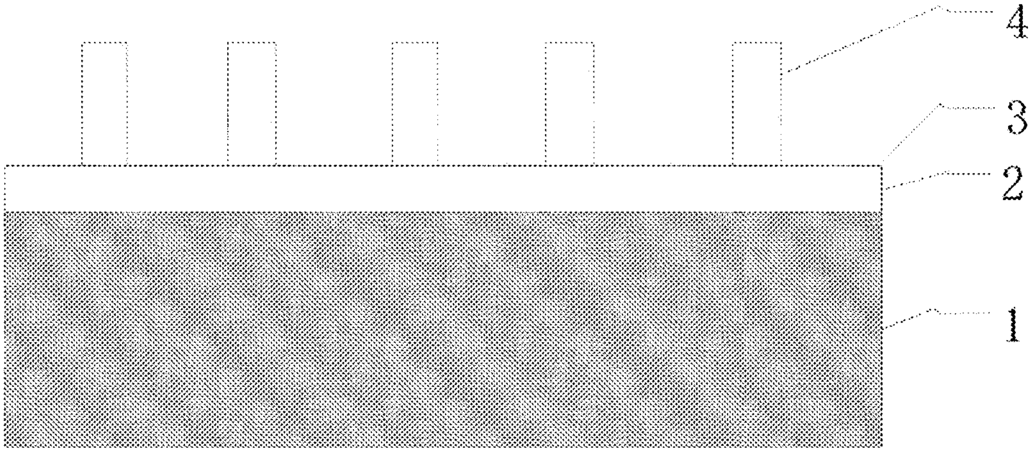
FIG. 7 is a top view of a negative electrode sheet in the second embodiment of the present application.

FIG. 7 is a top view of a negative electrode sheet in the second embodiment of the present application. As shown in FIG. 7, in some embodiments of the present application, the negative electrode sheet further comprises a tab 4; the tab 4 is formed by the negative electrode current collector protruding from the first side edge 3.

It can be understood that the tab 4 of the present application can be obtained by die-cutting the negative electrode current collector or by attaching the tab 4 to the negative electrode current collector. The tab 4 is used to connect with an external tab or external circuit.

Figure 8:
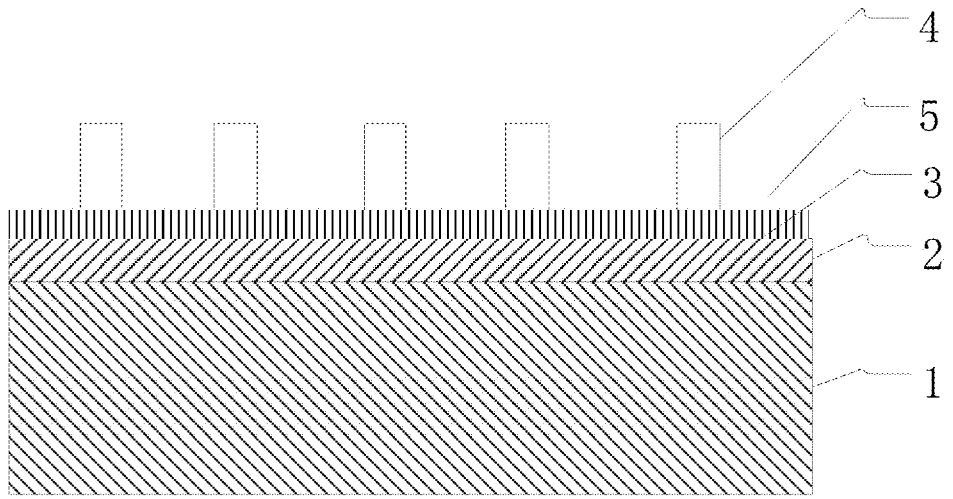
FIG. 8 is a top view of a negative electrode sheet in the third embodiment of the present application.

FIG. 8 is a top view of a negative electrode sheet in the third embodiment of the present application. As shown in FIG. 8, in some embodiments of the present application, the negative electrode sheet further comprises a serrated extension part 5, and the serrated extension part 5 is located at and/or protrudes from the first side edge 3.

One end of the serrated extension part 5 is connected with the second negative electrode active layer 2, and the other end of the serrated extension part 5 extends in a direction away from the second negative electrode active layer 2.

In the present application, the serrated extension part 5 may be located at the first side edge 3, and may protrude from the first side edge 3, or may be namely located at and protrude from the first side edge 3. The serrated extension part 5 can enhance the mechanical properties of the current collector and reduce the turnover ratio of the side edge of the current collector.

In some embodiments of the present application, the serrated extension part 5 is located at the first side edge 3, the serrated extension part 5 may exist on the tab 4, and the extension direction of the serrated extension part 5 is the same as the extension direction of the tab 4. The serrated extension part 5 has a reinforcing rib effect on the tab 4, which can enhance the mechanical properties of the tab 4, and the serrated extension part 5 has a certain binding force on the bending of the tab 4, and reduces the turnover bending ratio of the tab 4, thereby effectively avoiding the short circuit of lithium-ion battery.

The present application does not limit the specific shape of the serrated extension part 5, as long as it does not affect the subsequent process (tab welding).

In some embodiments of the present application, the serrated extension part 5 comprises N serrated sub-extension parts arranged sequentially in the second direction of the negative electrode current collector, and the second direction is perpendicular to the first direction, N>1.

In the first direction, the serrated sub-extension parts 5 have a size of W3, 0 μm<W3≤100 μm.

It can be understood that when the serrated sub-extension parts 5 have a size of 0 μm<W3≤100 μm, the subsequent processes such as tab welding can not be affected. Further, in order to avoid the influence on the subsequent processes such as tab welding and to enhance the mechanical properties of the tab 4 as much as possible, the serrated sub-extension parts can have a size of 50 μm-100 μm.

As can be seen from FIG. 4, in the first direction, the serrated sub-extension parts have a size of 50 μm-100 μm. As can be seen from FIG. 5, in the first direction, the serrated sub-extension parts have a size of 56 μm.

In the present application, in order to improve the reinforcing rib effect of the serrated sub-extension parts on the tab 4 and to avoid short circuiting of the lithium-ion battery without affecting the energy density of the lithium-ion battery, in some embodiments, the maximum distance between adjacent serrated sub-extension parts is 50 μm-60 μm.

In some embodiments, a method for preparing the negative electrode sheet of the present application may include the following steps:

1) disposing the first negative electrode active layer 1 on at least one functional surface of the negative electrode current collector;
2) performing thermal effect treatment on the first side surface of the first negative electrode active layer 1 to obtain the negative electrode sheet;

the first side surface extends along the second direction of the negative electrode current collector, nears the first side edge 3 and is perpendicular to the negative electrode current collector.

In the aforementioned method for preparing the negative electrode sheet, by performing the thermal effect treatment on the first side surface of the first negative electrode active layer 1, the first side of the first negative electrode active layer 1, after absorbs energy, makes a part of the first negative electrode active layer 1 gasify to separate from the negative electrode current collector, and makes another part of the first negative electrode active layer 1 suffer thermal expansion to separate from the negative electrode current collector, therefore, a negative electrode sheet with a good thickness consistency can be obtained. The lithium-ion battery prepared by using this negative electrode sheet has a good thickness consistency, therefore, not only the appearance of the lithium-ion battery can be improved, but also the lithium precipitation phenomenon near the tab zone of the negative electrode can be reduced, thereby further improving the cycle performance of the lithium-ion battery. In addition, the problem that the transverse compaction density of the negative electrode sheet is inconsistent due to inconsistent thickness of the negative electrode sheet can be improved, thereby more likely avoiding the appearance of snake-shaped electrode sheets, so that the positive and negative electrode sheets in the obtained lithium-ion battery can be covered as completely as possible, thereby improving the safety performance of the lithium-ion battery.

In addition, the aforementioned method for preparing the negative electrode sheet may make the first negative electrode active layer 1 form a thermal effect layer near the first side edge 3. Because of the larger binding force between the thermal effect layer and the negative electrode current collector, the possibility of separation between the thermal effect layer near the tab zone and the negative electrode current collector can be reduced, and the breakage of the PP layer due to the peeled graphite in the first negative electrode active layer 1 can be avoided, and the formation of electron channels that are electrochemically corroded at broken positions of the PP layer can be avoided, further the phenomena such as bulging and corner cracking of the lithium-ion battery can be avoided, thereby improving the electrical performance of the lithium-ion battery, and extending the service life of the lithium-ion battery.

As known to persons of ordinary skill in the art, in the process of preparing the negative electrode sheet, the negative electrode active layer often needs to be subjected to rolling treatment. In the present application, the thermal effect treatment can be carried out before the rolling treatment or after the rolling treatment. Further, the thermal effect treatment is performed before the rolling treatment, and because of not very high attachment of the unrolled first negative electrode active layer 1 to the negative electrode current collector, the first negative electrode active layer 1 can be transformed into a thermal effect layer by using less energy at this moment, and the first negative electrode active layer 1 near the first side edge 3 can also be removed, thereby reducing energy consumption and cost.

It can be understood that the thermal effect treatment of the present application is also applicable to the treatment of the positive electrode sheet. When the positive electrode sheet is subjected to the thermal effect treatment, the positive electrode sheet having consistent thickness can be obtained, thereby overcoming the phenomenon that the depression occurs near the tab zone of a lithium-ion battery prepared from an existing edge-thinned positive electrode sheet, or improving the phenomenon that edge bulging occurs near the tab zone of a lithium-ion battery prepared from an existing edge-unthinned positive electrode sheet. The exemplary explanation is only made in the present application for the thermal effect treatment of negative electrode sheet.

In some embodiments of the present application, the thermal effect treatment comprises laser treatment;

In the laser treatment, the laser frequency is 200 KHz-1000 KHz; the laser speed is 10000 mm/s-15000 mm/s. In this process, the obtained binding force between the thermal effect layer and the negative electrode sheet can be stronger, the thermal effect layer near the tab zone 2 can be better attached to the negative electrode current collector, and the consistency of thickness of the obtained negative electrode sheet is better.

Further, the first surface of the first negative electrode active layer 1 can be subjected to laser treatment twice to obtain the negative electrode sheet, and after the two laser treatments, the obtained negative electrode sheet has a better thickness consistency, and the formed thermal effect layer has a higher binding force, so that the thermal effect layer near the tab zone is better attached to the negative electrode current collector, thereby improving the electrical performance of the lithium-ion battery and extending the service life of the lithium-ion battery.

The present application does not particularly limit the laser treatment manner, and any manner that can separate the negative electrode active layer near the tab connection from the negative electrode current collector falls within the protection scope of the present application. In some embodiments, the laser treatment manner may comprise the following three manners: (1) laser dry cleaning: using pulsed laser to directly radiate the first negative electrode active layer 1; (2) laser wet cleaning: depositing an aqueous liquid membrane on the surface of the first negative electrode active layer 1 at first, and using laser to make the liquid membrane explode, thereby achieving the transformation of the first negative electrode active layer 1 into a thermal effect layer; (3) laser and gas co-treatment: using pulsed laser to directly radiate the first negative electrode active layer 1, and using a gas to transform the first negative electrode active layer 1 into a thermal effect layer, and then using a wind nozzle to strongly remove remaining first negative electrode active layer 1. Further, the third laser treatment manner has the best treatment effect.

Figure 9:
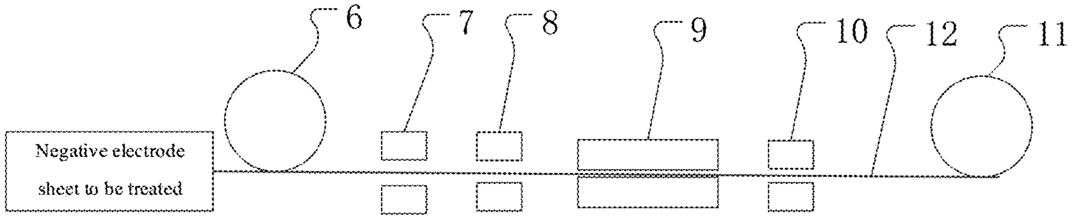
FIG. 9 is a diagram of an apparatus for preparing a negative electrode sheet in some embodiments of the present application.

FIG. 9 is a diagram of an apparatus for preparing a negative electrode sheet in some embodiments of the present application. As shown in FIG. 9, an apparatus for preparing a negative electrode sheet includes a deviation correcting control unit 6, a first photoelectric sensor 7, a laser treatment unit 8, a wind nozzle decontamination unit 9, a second photoelectric sensor 10, and a winding unit 11, which are connected in sequence, and also includes a transmission unit 12.

A negative electrode sheet to be treated passes through the deviation correcting control unit 6, the first photoelectric sensor 7, the laser treatment unit 8, the wind nozzle decontamination unit 9, the second photoelectric sensor 10, and the winding unit 11 in sequence under the transmission of the transmission unit 12.

The negative electrode sheet to be treated enters the deviation correcting control unit 6 under the transmission of the transmission unit 12, and the deviation correcting control unit 6 adjusts the left and right horizontal movement of the negative electrode sheet to be treated (the direction of the left and right horizontal movement is perpendicular to the transmission direction of the negative electrode sheet to be treated). The negative electrode sheet to be treated outputted by the deviation correcting control unit 6 enters the first photoelectric sensor 7 under the transmission of the transmission unit 12, the first photoelectric sensor 7 detects the offset of the negative electrode sheet to be treated and makes feedback to the deviation correcting control unit 6. The negative electrode sheet to be treated outputted by the first photoelectric sensor 7 enters the laser treatment unit 8 under the transmission of the transmission unit 12, where a first surface of a first negative electrode active layer near a tab zone is removed by laser. The negative electrode sheet to be treated, after being subjected to laser treatment, enters the wind nozzle decontamination unit 9 under the transmission of the transmission unit 12 to remove remaining first negative electrode active layer due to the laser treatment to obtain the negative electrode sheet. The negative electrode sheet enters the second photoelectric sensor 10 under the transmission of the transmission unit 12, and the second photoelectric sensor 10 is used to detect the offset of the negative electrode sheet and makes feedback to the deviation correcting control unit 11. The negative electrode sheet outputted by the second photoelectric sensor 10 enters the winding unit 11 for winding under the transmission of the transmission unit 12.

A second aspect of the present application provides a lithium-ion battery including the negative electrode sheet as described above.

Since the lithium-ion battery of the present application includes the negative electrode sheet as described above, the lithium-ion battery has a good thickness consistency, less lithium precipitation at the position of the negative electrode sheet near the first side edge 3, and a long service life.

Individual examples in the present specification are described in a relevant manner, and the same and similar parts between individual examples can be referred to each other, and each example focuses on the differences from other examples. The above are only better examples of the present application, not for the purpose of limiting the protection scope of the present application. Any modification, equivalent substitution, improvement, etc. made within the spirit and principles of the present application are included in the protection scope of the present application.

What is claimed is:

1. A negative electrode sheet, comprising a negative electrode current collector, and a negative electrode active layer that is disposed on at least one functional surface of the negative electrode current collector;

the negative electrode active layer comprises a first negative electrode active layer and a second negative electrode active layer in a first direction of the negative electrode current collector;

the second negative electrode active layer is closer than the first negative electrode active layer to a first side edge of the negative electrode current collector;

a ratio of a thickness of the second negative electrode active layer to a thickness of the first negative electrode active layer is (0.8-1.1):1;

wherein the negative electrode sheet further comprises a serrated extension part, and the serrated extension part is located at and/or protrudes from the first side edge;

one end of the serrated extension part is connected to the second negative electrode active layer and the other end of the serrated extension part extends in a direction away from the second negative electrode active layer;

wherein the serrated extension part comprises N serrated sub-extension parts arranged sequentially in a second direction of the negative electrode current collector, and the second direction is perpendicular to the first direction, N>1;

wherein in the first direction, the serrated sub-extension parts have a size of W3, $0\ \mu m < W3 \leq 100\ \mu m$.

2. The negative electrode sheet according to claim 1, wherein the thickness of the second negative electrode active layer is equal to the thickness of the first negative electrode active layer.

3. The negative electrode sheet according to claim 2, wherein the second negative electrode active layer is a thermal effect layer formed by thermal effect treatment of the first negative electrode active layer.

4. The negative electrode sheet according to claim 2, wherein, in the first direction, the second negative electrode active layer has a size of W2 and the first negative electrode active layer has a size of W1, W1>W2.

5. The negative electrode sheet according to claim 1, wherein the second negative electrode active layer is a thermal effect layer formed by thermal effect treatment of the first negative electrode active layer.

6. The negative electrode sheet according to claim 5, wherein the thermal effect layer has a plurality of hardened tissues having graphite crystal structures, and the hardened tissues are closely attached to the negative electrode current collector.

7. The negative electrode sheet according to claim 5, wherein a hardening degree of the thermal effect layer is greater than that of the first negative electrode active layer.

8. The negative electrode sheet according to claim 1, wherein, in the first direction, the second negative electrode active layer has a size of W2 and the first negative electrode active layer has a size of W1, W1>W2.

9. The negative electrode sheet according to claim 8, wherein W2=2 μm-30 μm.

10. The negative electrode sheet according to claim 1, wherein the negative electrode sheet further comprises a tab;

the tab is formed by the negative electrode current collector protruding from the first side edge.

11. The negative electrode sheet according to claim 1, wherein the negative electrode sheet further comprises a tab; the tab is formed by the negative electrode current collector protruding from the first side edge, the extension direction of the serrated extension part is the same as the extension direction of the tab, and the serrated extension part is located on the tab to serve as reinforcement.

12. The negative electrode sheet according to claim 1, wherein in the first direction, the serrated sub-extension parts have a size of 50 μm-100 μm.

13. The negative electrode sheet according to claim 1, wherein the maximum distance between adjacent serrated sub-extension parts is 50 μm-60 μm.

14. A lithium-ion battery comprising the negative electrode sheet according to claim 1.

* * * * *